Nov. 14, 1933.                H. H. BLAU                1,935,587
                             COFFEE MAKER
                          Filed Nov. 17, 1932
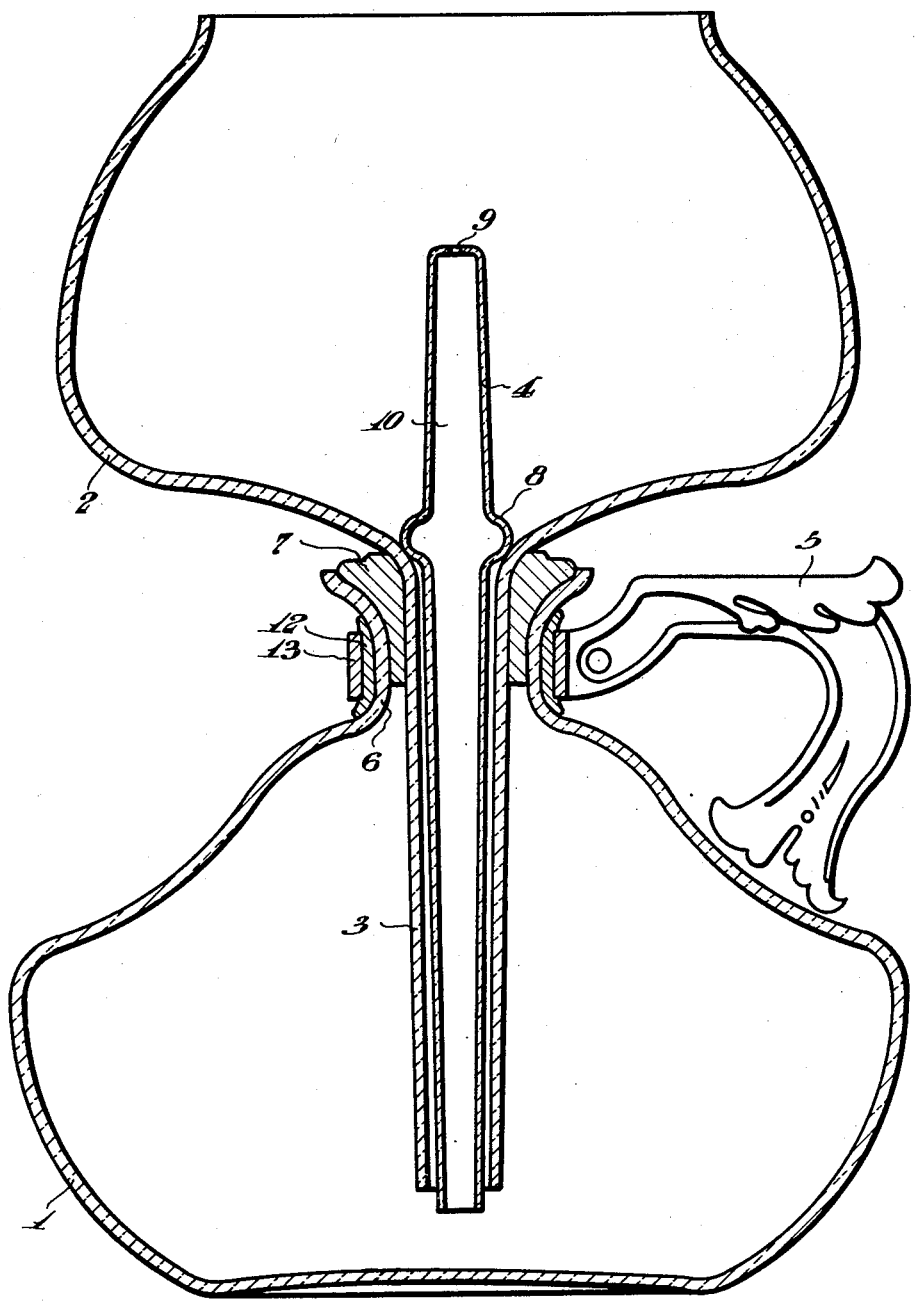
WITNESSES.                                    INVENTOR.
                                            Henry H. Blau.
                                        BY
                                          Brown, Critchlow, & Flick
                                                    ATTORNEYS Patented Nov. 14, 1933

1,935,587

UNITED STATES PATENT OFFICE 1,935,587

COFFEE MAKER

Henry H. Blau, Charleroi, Pa., assignor to Macbeth-Evans Glass Company, Charleroi, Pa., a corporation of Pennsylvania Application November 17, 1932
Serial No. 643,040

5 Claims. (Cl. 53—3)

My invention relates to coffee makers, and particularly to coffee makers of the so-called vacuum type in which liquid is caused to flow automatically by pressure or vacuum from one container to another.

The subject matter of the present application is closely related to and is a modification of that of the copending application of Raymond W. Kell and Charles D. Barth, Serial No. 643,060, filed November 17, 1932.

It has been proposed heretofore to provide coffee makers of the same general type as that of the present invention, but the devices of the prior art have had certain disadvantages that are avoided in the coffee maker of my invention. For example, certain coffee makers that have been proposed have required the employment of straining devices of fabric that must be replaced at frequent intervals and which when used must be either discarded or washed and dried between successive uses thereof.

Other coffee makers have included metal parts with which the liquid coffee is in contact while at a relatively high temperature. The coffee reacts chemically with the metal surfaces of such parts and the result is to impart a taste or flavor to the coffee that is foreign to the natural taste of coffee. In addition, the salts produced by such chemical reactions may be somewhat disagreeable, or possibly even slightly harmful in the case of certain metals, such as brass or copper.

In accordance with the present invention I provide a coffee maker all of the interior parts of which are non-metallic and preferably of glass or other suitable ceramic or refractory material that is inert with respect to the chemical constituents of coffee and which does not impart an unnatural taste thereto. Furthermore, the coffee maker of my invention comprises such relatively few and simple parts that uniformly excellent coffee may be made even by those of little skill in the art of making coffee. Also, the construction of the coffee maker is such that it may be easily and conveniently assembled and disassembled for cleaning or sterilizing of the surfaces in contact with the coffee.

An important feature of my coffee maker is the provision of a member of glass having a relatively small opening therethrough to provide a vent. This member serves as a valve to permit flow of water from one container to the other, but acts as a filter or strainer to prevent the passage of sediment or grounds that may be contained in the liquid coffee when the latter flows in the opposite direction. This valve or closure member is loosely mounted in position and is retained by gravity only.

The details of my invention will be described in connection with the accompanying drawing, in which the single figure is a view in central vertical section of the improved coffee maker.

Referring to the drawing, the coffee maker of my invention comprises a lower container 1, an upper container 2 having an integral tube 3 extending vertically into the lower container 1, a valve or strainer 4 for the tube 3, and a handle 5 for the lower container 1.

The lower container 1, which is preferably of glass, is provided at its top with a relatively small neck portion 6, the upper portion of which flares outwardly, whereby the container may be conveniently filled with water, or coffee may be poured therefrom.

The upper container 2 is also preferably of glass and it may be open at its top. The tube 3 is provided adjacent to its upper end with a sleeve or gasket 7 that is of rubber or other suitable flexible or resilient material, and which when inserted within the neck portion 6 of the lower container hermetically seals the connection between the containers 1 and 2. The tube 3 ends a short distance above the bottom of the lower container 1, this distance regulating the level of the water remaining in the lower container during the operation of the coffee maker.

The strainer 4 comprises a hollow glass tube having an enlarged curved portion 8 that constitutes a valve for the opening through the tube 3. The curved bottom surface of the portion 8 rests upon the portion of the upper container 2 surrounding the opening in tube 3, and the lower portion of the strainer extends downwardly into the tube 3. The upper portion projects upwardly from the enlarged portion 8 and serves as a handle by means of which the closure member 4 may be placed in or removed from its illustrated position. The upper end of the member 4 is closed except for a very small opening or vent 9 which communicates with the hollow bore 10 of the tube. The vent 9 constitutes therefore a constricted portion of the passageway provided in part by the hollow bore 10 of the strainer 4. The vent 9 limits the flow of fluid which may be air or steam between the two containers.

This arrangement provides that the strainer 4 may move freely upwardly against the force of gravity to permit the upward flow of liquid through the tube 3. The bottom surfaces of the strainer 4, even if of smooth glass, have a slightly imperfect fit with the adjacent walls of the container 2, and accordingly liquid may be drawn downwardly between these surfaces at a relatively slow rate, as will be later described. However, in order to insure that there will not be a perfectly fluid-tight fit between these surfaces, the enlargement 8 of the strainer 4 may be provided with a slightly rough surface which may be secured by the addition of fine sand or fine glass particles while this portion is hot and in a slightly plastic state, and then applying a flame thereto for a brief period. An equivalent effect may be secured by forming the strainer 4 in a mold adapted to provide a surface that is stippled or slightly irregular or that has very fine grooves extending along the lines of flow of liquid.

The neck portion 6 of the lower container 1 is provided with a sleeve 12 that is of rubber or other suitable resilient and heat-insulating material, and which is gripped by a hinged clamping ring 13 of the handle 5, which may be of metal, if desired, since it is not in contact with the coffee.

In the operation of the improved coffee maker it may be assumed that the upper container 2 is separated from the lower container 1 and that the latter has been filled with water to a suitable level. It will be understood that the quantity of water will correspond approximately to that of the coffee that is desired to be made. The upper container, having the strainer 4 in place, and with its sleeve 7, is then placed in sealing position on the lower container 1 as illustrated, and sufficient ground coffee is placed in the upper container 2 to make the beverage of the desired strength.

The lower container is then suitably heated, as by gas or electricity, as desired, and when the water contained therein reaches the boiling point steam will be formed which will collect above the surface of the water, and the pressure in the lower container will gradually increase. As the boiling continues and the pressure increases, water will be forced upwardly through the tube 3 and around the strainer 4 into the upper container 2.

If the heating of the water is gradual, the strainer 4 will not be lifted to an appreciable degree, but if the heating is rapid, the strainer 4 may be lifted to permit the water to flow at a rate corresponding to that of the generation of steam in the lower container 1. This flow continues until the level of the water falls to the bottom of the tube 3.

The hot water which is now in the upper container 2 causes an infusion of the coffee therein. The liquid remains in the upper container as long as sufficient heat is applied to the bottom of the lower container to maintain the pressure required. In addition, continued boiling of the water in the lower container will force steam upwardly through tube 3, and it will escape to the atmosphere through the liquid in the upper container. This process may continue for any desired time, but preferably not more than from three to five minutes. At the end of the desired period heating of the water in the container below is discontinued. The strainer 4, in case it has been lifted, then drops to its illustrated position.

The steam above the surface of the water in the lower container now gradually condenses as the temperature falls with a corresponding lowering of pressure therein, and when the steam is sufficiently condensed the vacuum thus produced causes the water in the upper container to be forced downwardly through the extremely narrow crevices between the strainer 4 and the walls of the upper container 2, whereby the liquid coffee flows through at a relatively slow rate and the sediment or grounds of the coffee are retained in the upper container because the extremely slight openings are not sufficient to permit them to flow past the strainer.

The downward flow continues until all of the liquid is transferred to the lower container. It has been found that if a strainer of solid form be used some sediment may be drawn past the strainer as the seal of liquid around the strainer is broken at the completion of its flow. It has been found also that if a strainer of the same general type as that employed herein be provided with a small vent opening, the surge of air or other cause for the movement of the sediment will not occur and all of the sediment will be retained by the strainer.

The upper container may be removed at any time before the coffee is served. The liquid coffee which is now in the lower container may be served from the latter by using the handle 5 to lift or tilt the lower container, as desired.

The strainer 4 may be removed by means of the handle provided by its upper part and may be replaced when desired by the same means.

Inasmuch as all of the parts of the coffee maker with which the liquid coffee comes in contact are of glass which is inert to the chemical constituents of coffee, there can be no foreign taste such as that caused by contact of hot liquid coffee with metal surfaces. The operation of the coffee maker is extremely simple and entirely automatic when heat is applied thereto and is discontinued. The process is continued until certain desirable constituents of the coffee have been infused into the liquid, and the beverage thus produced has the natural taste of coffee.

While the apparatus of the present invention has been described with particular reference to coffee, it is also peculiarly adapted to the making of tea, since the liquid in the upper container is always below the boiling point. It is well known that in making tea boiling water should not be in contact with the tea leaves.

The apparatus is also adapted for making infusions of various kinds, such as chemical or pharmaceutical preparations, as will be readily understood.

The apparatus contains only one movable part that is necessary to be removed for cleaning or sterilizing of the parts in contact with the coffee.

These and various other advantages will be appreciated by those skilled in the art of manufacturing and operating coffee makers.

I claim:

1. Apparatus for making infusions of coffee, tea or the like, comprising two superposed containers having a vertical connecting tube therebetween, and a strainer for said tube that is freely movable upwardly for permitting upward flow of liquid through said tube and which only approximately closes said tube in its closed position, said strainer being of elongated form and having a passageway therein communicating with both of said containers to constitute a vent therebetween when said strainer is in closed position, said passageway having a constricted portion for limiting the flow of fluid through said passageway.

2. Apparatus for making infusions of coffee, tea or the like, comprising two superposed containers having a vertical connecting tube therebetween, and a strainer for said tube that is freely movable upwardly for permitting upward flow of liquid through said tube and which only approximately closes said tube in its closed position, said strainer having integral therewith a vertical portion projecting downwardly into said tube and having also a passageway therethrough having at one end thereof a relatively small opening to constitute a vent between said containers that is operable to slowly modify a pressure differential therebetween.

3. Apparatus for making infusions of coffee, tea or the like, comprising two superposed containers having a vertical connecting tube therebetween, and a strainer for said tube that is freely movable upwardly for permitting upward flow of liquid through said tube and which only approximately closes said tube in its closed position, said strainer having integral therewith a vertical portion projecting downwardly into said tube and a vertical portion projecting upwardly to constitute a handle therefor and having a small opening in the upper end thereof and a longitudinal passageway connected with said small opening and extending through the strainer and the lower vertical portion to constitute a vent between said containers when the strainer is in its closed position.

4. Apparatus for making infusions of coffee, tea or the like, comprising two superposed containers of glass, a tube of glass for connecting them, and a glass strainer for said tube at one end thereof comprising a curved portion larger than the bore of said tube and two vertical portions having a passageway extending longitudinally thereof and comprising a constricted portion, said passageway serving as a vent between said containers when said strainer is in its closed position.

5. Apparatus for making infusions of coffee, tea or the like, comprising two superposed containers of glass, a tube of glass for connecting them, and a glass strainer for said tube at one end thereof, said strainer comprising a hollow tube of glass the diameter of which is less than that of the connecting tube and having an enlarged intermediate portion adapted to close the upper end of the connecting tube, and said strainer having a passageway therein which communicates at one end directly with one of said containers and at the other end through a small vent opening with the other container.

HENRY H. BLAU.